United States Patent
Lei et al.

(10) Patent No.: US 10,205,332 B2
(45) Date of Patent: Feb. 12, 2019

(54) EFFICIENT TWO WAY CHARGING METHOD USING MASTER AND SLAVE DEVICES

(71) Applicant: Xiaomi Inc., Beijing (CN)

(72) Inventors: Zhenfei Lei, Beijing (CN); Wei Sun, Beijing (CN); Xiangdong Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 232 days.

(21) Appl. No.: 15/214,462

(22) Filed: Jul. 20, 2016

(65) Prior Publication Data
US 2017/0025874 A1 Jan. 26, 2017

(30) Foreign Application Priority Data
Jul. 20, 2015 (CN) .......................... 2015 1 0428970

(51) Int. Cl.
H02J 7/00 (2006.01)
G06F 1/00 (2006.01)
H04W 88/02 (2009.01)

(52) U.S. Cl.
CPC .......... *H02J 7/0054* (2013.01); *H02J 7/0047* (2013.01); *H02J 2007/005* (2013.01); *H02J 2007/0062* (2013.01); *H04W 88/02* (2013.01)

(58) Field of Classification Search
CPC ....... Y02E 60/12; H02J 7/0054; H02J 7/0047; H02J 2007/005; H02J 2007/0062;
(Continued)

(56) References Cited

U.S. PATENT DOCUMENTS

2007/0236975 A1 10/2007 Lippojoki et al.
2009/0134836 A1* 5/2009 Zhao ..................... H02J 7/0054
320/103
(Continued)

FOREIGN PATENT DOCUMENTS

CN  101340652 A  1/2009
CN  102255346 A  11/2011
(Continued)

OTHER PUBLICATIONS

"International Search Report for PCT/CN2015/098849".
(Continued)

*Primary Examiner* — Yalkew Fantu
*Assistant Examiner* — Mohammed J Sharief
(74) *Attorney, Agent, or Firm* — Jun He Law Offices P.C.; James J. Zhu

(57) ABSTRACT

A charging method is provided. The method includes: receiving a direction setting signal, and determining a charging direction according to the direction setting signal; determining a charging operation as charging a slave device with a master device when the charging direction is a first charging direction; determining the charging operation as charging the master device with the slave device when the charging direction is a second charging direction opposite to the first charging direction; and sending to a power management module of the master device and to a power management module of the slave device a charging instruction according to the charging operation determined. Accordingly, two smart devices connected through a connecting line may be charged by each other according to a user-defined charging direction.

13 Claims, 13 Drawing Sheets

(58) Field of Classification Search
CPC ..... H01M 10/44; H01M 10/46; H04W 88/02; G06F 1/3203; G06F 1/26; G06F 1/3296; Y02B 60/1217; Y02B 60/1285
USPC .......................................... 320/103; 713/300
See application file for complete search history.

(56) References Cited

U.S. PATENT DOCUMENTS

| | | | | |
|---|---|---|---|---|
| 2011/0016333 | A1* | 1/2011 | Scott | G06F 1/266 713/300 |
| 2013/0217274 | A1* | 8/2013 | Bar-Niv | H01R 27/02 439/676 |
| 2014/0299372 | A1* | 10/2014 | Meazell | G06F 1/263 174/74 R |
| 2015/0091497 | A1 | 4/2015 | Leung | |
| 2015/0244185 | A1 | 8/2015 | Won et al. | |
| 2015/0340898 | A1* | 11/2015 | Schwartz | G06F 1/266 320/103 |
| 2015/0364946 | A1 | 12/2015 | Wang | |

FOREIGN PATENT DOCUMENTS

| | | |
|---|---|---|
| CN | 102566675 A | 7/2012 |
| CN | 103248089 A | 8/2013 |
| CN | 103457458 A | 12/2013 |
| CN | 103682491 A | 3/2014 |
| CN | 103972957 A | 8/2014 |
| CN | 105098273 A | 11/2015 |
| CN | 105098888 A | 11/2015 |
| EP | 2911036 A1 | 8/2015 |
| JP | 2005287278 A | 10/2005 |
| JP | 2009232638 A | 10/2009 |
| JP | 2010115064 A | 5/2010 |
| KR | 20110004618 A | 1/2011 |
| RU | 2400904 C1 | 9/2010 |

OTHER PUBLICATIONS

Stormy Beach, "New Device to Device Charging Cable Announced by Samsung", published on Sep. 23, 2014, XP055318001, Online(http://androidspin.com/2014/09/23/new-device-device-charging-cable-announced-samsung/).
Extended European Search Report for European application No. 16177170.4, dated Nov. 29, 2016.
International Search Report for International application No. PCT/CN2015/098849, dated Apr. 22, 2016.
Russia First Office action and Corresponding English Translation for Russia application No. 2016116959/07(026644), dated Aug. 4, 2017.

* cited by examiner

EFFICIENT TWO WAY CHARGING METHOD USING MASTER AND SLAVE DEVICES

CROSS-REFERENCE TO RELATED APPLICATIONS

This application is based upon and claims priority to Chinese Patent Application 201510428970.6, filed on Jul. 20, 2015, the entire contents of which are incorporated herein by reference.

TECHNICAL FIELD

The present disclosure generally relates to the field of smart device technology, and more particularly, to charging methods and devices utilizing the charging method.

BACKGROUND

A smart device plays an increasingly important role in people's daily life. However, due to a small capacity of a built-in battery, a portable smart device such as a smart mobile phone has short endurance time. In order to solve the problem of short endurance time, a user generally carries a mobile power supply to provide extra electric power for the smart device when it has low electric power.

SUMMARY

Embodiments of the present disclosure provide charging methods and devices utilizing the charging method.

According to a first aspect of the embodiments of the present disclosure, a charging method is provided, which is applicable in a master device with a multifunctional I/O (Input/Output) interface for connection with to a multifunctional I/O interface of a slave device using a connecting line. The method includes: receiving a direction setting signal, and determining a charging direction according to the direction setting signal; determining a charging operation as charging the slave device with the master device when the charging direction is a first charging direction; determining the charging operation as charging the master device with the slave device when the charging direction is a second charging direction opposite to the first charging direction; and sending to a power management module of the master device and to a power management module of the slave device according to the charging operation determined.

According to a second aspect of the embodiments of the present disclosure, a charging method is provided, which is applicable in a slave device with a multifunctional I/O interface configured for connection with a multifunctional I/O interface of a master device through a connecting line. The charging method includes: receiving a charging instruction sent from the master device to a power management module of the slave device, where the charging instruction is generated by the master device from a charging operation determined according to a user-defined charging direction; and performing the charging operation together with the master device through the connecting line and the power management module according to the charging instruction.

According to a third aspect of the embodiments of the present disclosure, a master device is provided. The master device includes: a processor; a multifunctional input/output (I/O) interface configured for connection with a multifunctional I/O interface of a slave device through a connecting line; and a memory configured to store a processor-executable instruction. The processor is configured to perform: receiving a direction setting signal, and determine a charging direction according to the direction setting signal; determining a charging operation as charging the slave device with the master device when the charging direction is a first charging direction; determining the charging operation as charging the master device with the slave device when the charging direction is a second charging direction opposite to the first charging direction; and sending to a power management module of the master device and to a power management module of the slave device a charging instruction according to the charging operation determined.

According to the fourth aspect of the embodiments of the present disclosure, a slave device is provided. The slave device includes: a processor; a multifunctional input/output (I/O) interface configured for connection with a multifunctional I/O interface of a master device through a connecting line; and a memory configured to store a processor-executable instruction. The processor is configured to perform: receiving a charging instruction sent from the master device to a power management module of the slave device, wherein the charging instruction is generated by the master device from a charging operation determined according to a user-defined charging direction; and performing the charging operation together with the master device through a connecting line for connecting the master device with the slave device and the power management module according to the charging instruction.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Specific embodiments of the present disclosure are shown by the above drawings, and more detailed description will be made hereinafter. These drawings and text description are not for limiting the scope of conceiving the present disclosure in any way, but for illustrating the concept of the present disclosure for those skilled in the art by referring to specific embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
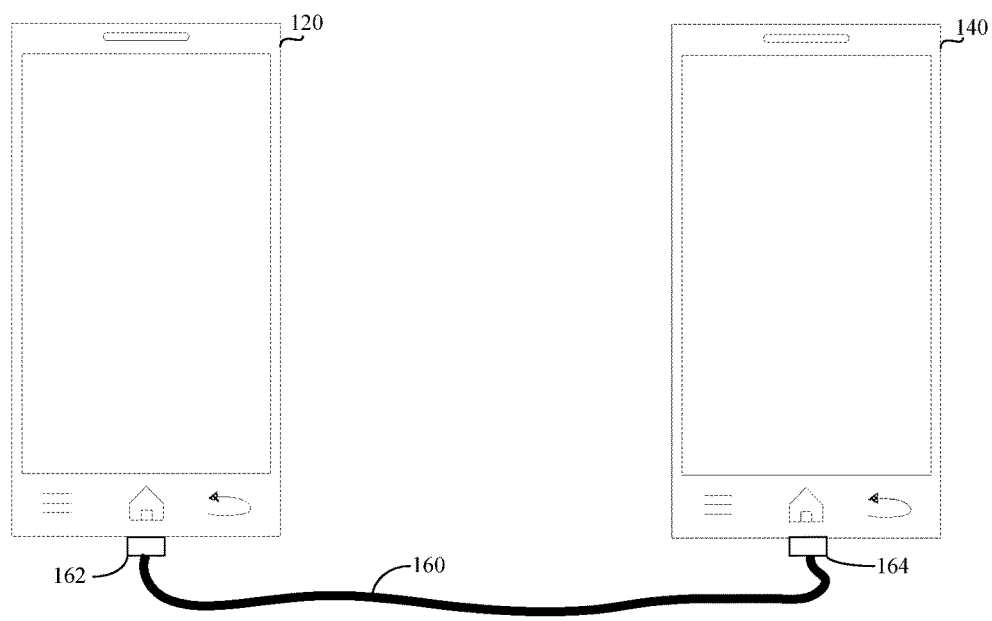
FIG. 1 is a schematic diagram of an application scenario for implementing a charging method according to embodiments of the present disclosure.

Referring to FIG. 1, which is a schematic diagram of an application scenario for implementing a charging method according to embodiments of the present disclosure. A master device 120, a slave device 140 and a connecting line 160 are included in the application scenario.

The master device 120 and the slave device 140 are electronic devices having one or more multifunctional I/O interfaces. The electronic device may be a smart mobile phone, a tablet computer, an ebook reader, an MP3 (Moving Picture Experts Group Audio Layer III) player, an MP4 (Moving Picture Experts Group Audio Layer IV) player or a laptop computer and the like. Generally, the multifunctional I/O interface of the master device 120 is the same as that of the slave device 140, and the multifunctional I/O interface can implement switchover between the master device and the slave device. For example, the multifunctional I/O interface may be a Type C interface.

The master device 120 is connected with the slave device 140 through the connecting line 160. A first connector 162 and a second connector 164 of the connecting line 160 are respectively adapted for connection with the multifunctional I/O interfaces of the master device 120 and the slave device 140. For example, when the multifunctional I/O interfaces of the master device 120 and the slave device 140 are both Type C interfaces, the connecting line 160 is a Type C connecting line, and the connector 162 and the connector 164 of the Type C connecting line are Type C connectors.

For ease of description, in the following embodiments, it is described by taking an example where the master device 120 and the slave device 140 are smart mobile phones, the multifunctional I/O interfaces of the master device 120 and the slave device 140 are Type C interfaces, and the connecting line 160 is a Type C connecting line, which does not limit the present disclosure.

Figure 2A:
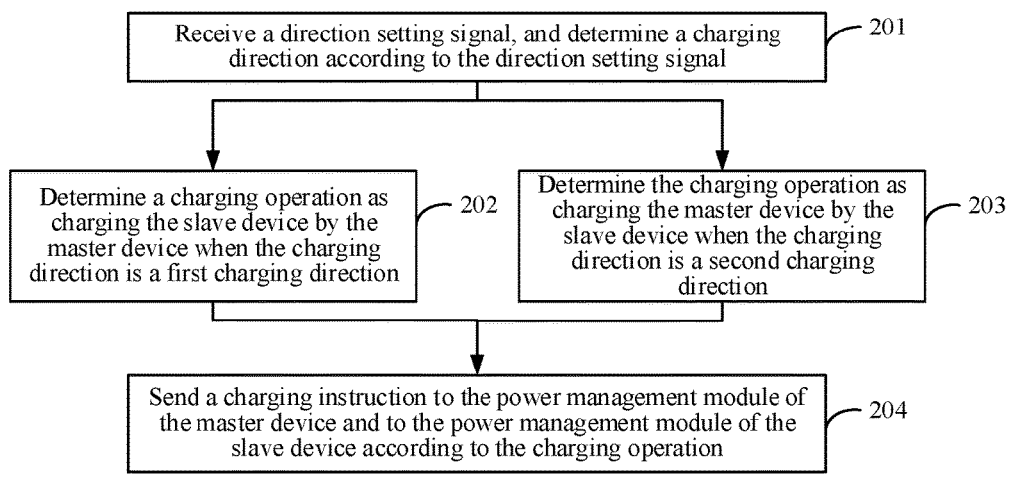
FIG. 2A is a flowchart of a charging method shown according to an exemplary embodiment.

FIG. 2A is a flowchart of a charging method according to an exemplary embodiment. This embodiment is described by taking an example where the charging method is used in the master device 120 in the application scenario as shown in FIG. 1, and the method includes the following steps.

In Step 201, a direction setting signal is received, and a charging direction is determined according to the direction setting signal.

In Step 202, it is determined that a charging operation charges the slave device with the master device when the charging direction is a first charging direction.

In Step 203, it is determined that the charging operation charges the master device with the slave device when the charging direction is a second charging direction opposite to the first charging direction.

In Step 204, a charging instruction is sent to the power management module of the master device and to the power management module of the slave device according to the charging operation.

In conclusion, in the charging method provided by this embodiment, a charging instruction is sent to the power management module of the master device and to the power management module of the slave device according to a charging direction defined by the master device, thereby implementing charging the slave device by the master slave or charging the master device by the slave device. In this way, it is solved that a smart device can only be charged by a mobile power supply which is large in size and inconvenient for a user to carry. Furthermore, the method achieves the effect that two smart devices connected through a connecting line may be charged by each other according to a user-defined charging direction.

Figure 2B:
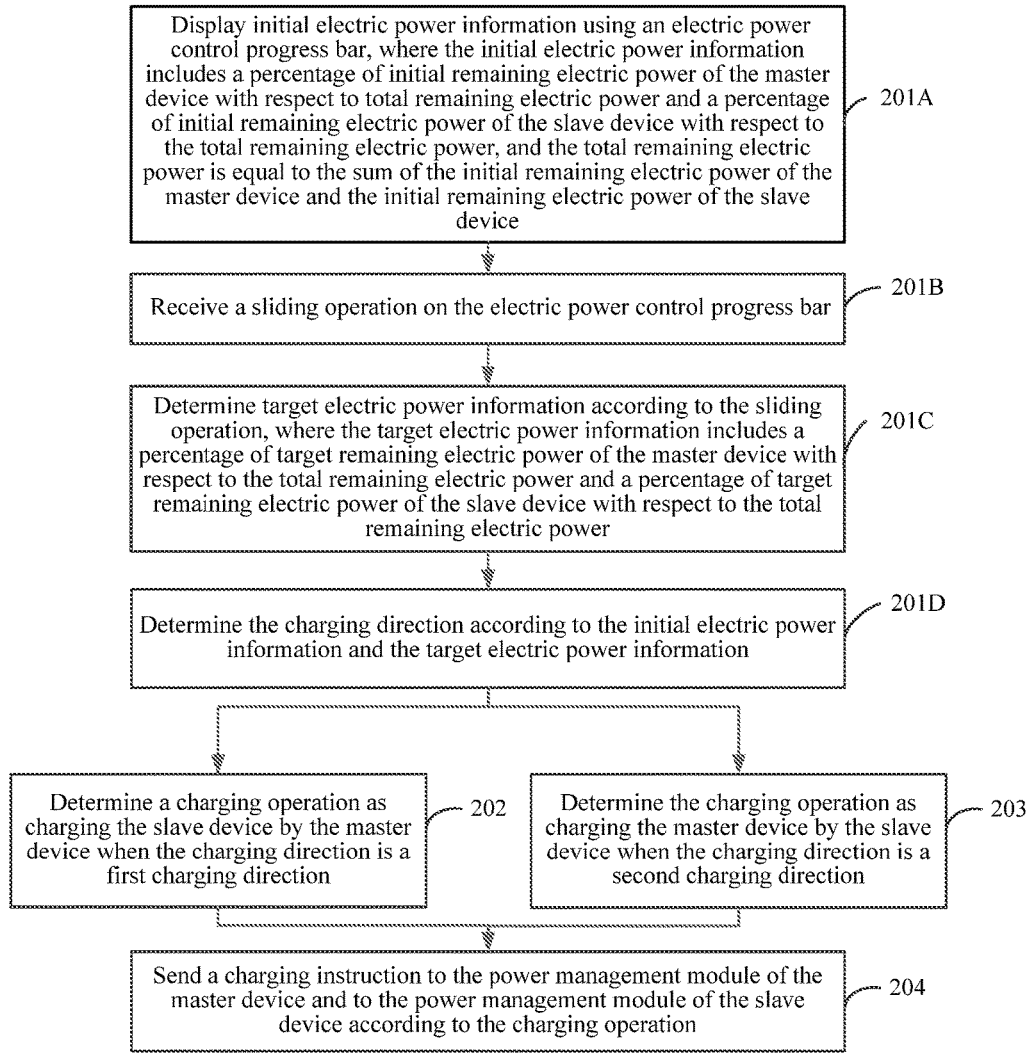
FIG. 2B is a flowchart of a charging direction setting process involved in a charging method shown according to an exemplary embodiment.

In order that the user can more intuitively learn about the remaining electric power of the master device and the slave device and set a charging direction according to the remaining electric power, the master device may display the remaining electric power of the master device and the slave device in form of a progress bar, and receive, with the progress bar, the user-defined target remaining electric power. As a possible implementation, as shown in FIG. 2B, the foregoing Step 201 may include the following sub-steps.

In sub-step 201A, initial electric power information is displayed using an electric power control progress bar. The initial electric power information includes a percentage of initial remaining electric power of the master device with respect to total remaining electric power and a percentage of initial remaining electric power of the slave device with respect to the total remaining electric power. The total remaining electric power is equal to the sum of the initial remaining electric power of the master device and the initial remaining electric power of the slave device.

In sub-step 201B, a sliding operation on the electric power control progress bar is received.

In sub-step 201C, target electric power information is determined according to the sliding operation. The target electric power information includes a percentage of target remaining electric power of the master device with respect to the total remaining electric power and a percentage of target remaining electric power of the slave device with respect to the total remaining electric power.

In sub-step 201D, the charging direction is determined according to the initial electric power information and the target electric power information.

Figure 2C:
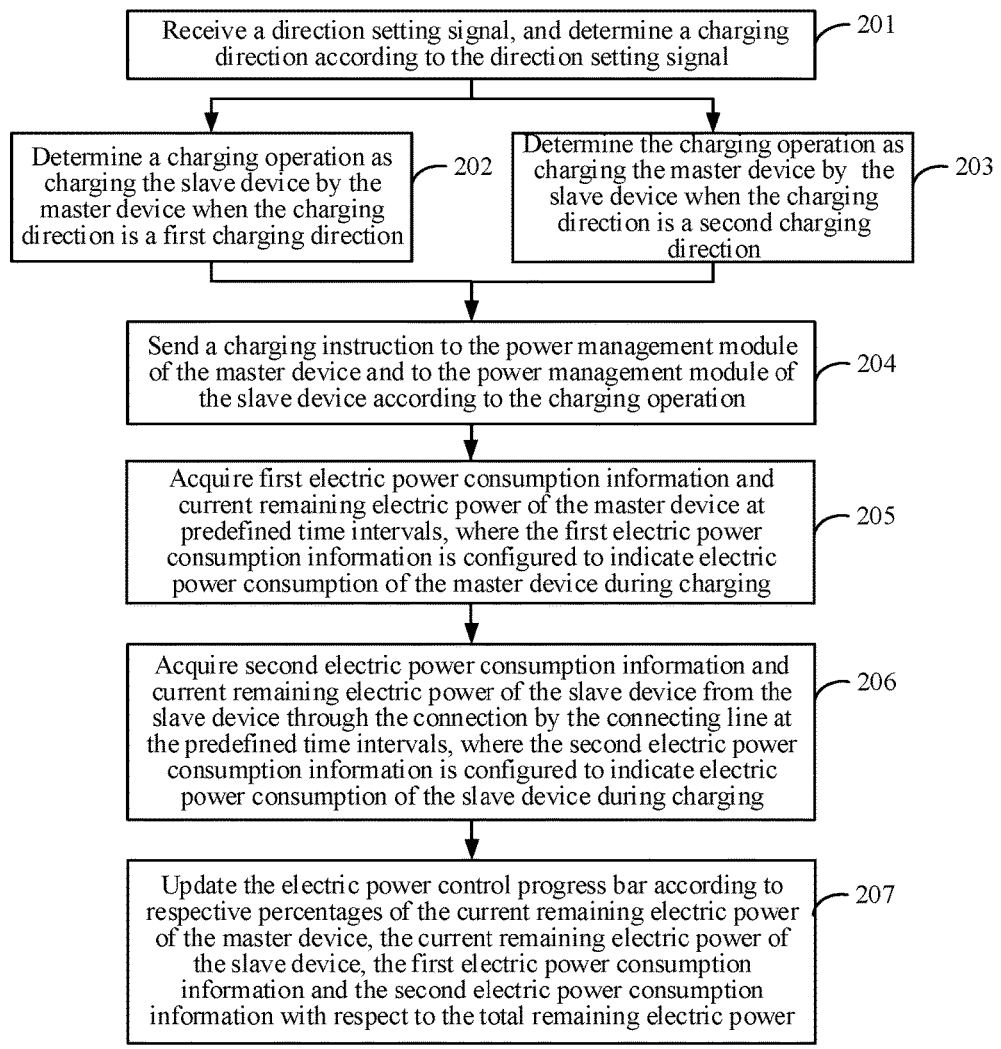
FIG. 2C is a flowchart of an electric power control progress bar updating process involved in a charging method shown according to another exemplary embodiment.

In order that the user can learn, in real time, about the charging condition between the master device and the slave device, the master device may acquire current remaining electric power of the master device and the slave device at predefined time intervals, and update the progress bar according to information on the current remaining electric power. As a possible implementation, as shown in FIG. 2C, the method may further include the following steps.

In Step 205, first electric power consumption information and current remaining electric power of the master device are acquired at predefined time intervals. The first electric power consumption information is configured to indicate electric power consumption of the master device during charging.

In Step 206, second electric power consumption information and slave device current remaining electric power are acquired from the slave device through the connection by the connecting line at the predefined time intervals. The second electric power consumption information is configured to indicate electric power consumption of the slave device during charging.

In Step 207, the electric power control progress bar is updated according to the respective percentages of the current remaining electric power of the master device, the current remaining electric power of the slave device, the first electric power consumption information and the second electric power consumption information with respect to the total remaining electric power.

Figure 3:
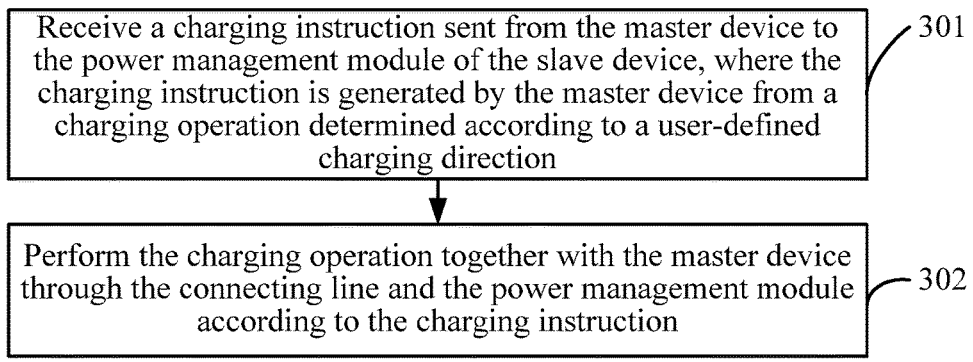
FIG. 3 is a flowchart of a charging method shown according to another exemplary embodiment.

FIG. 3 is a flowchart of a charging method shown according to another exemplary embodiment. This embodiment is described by taking an example where the charging method is used in the slave device 140 in the application scenario as shown in FIG. 1, and the method includes the following steps.

In Step 301, it is received a charging instruction sent from the master device to the power management module of the slave device. The charging instruction is generated by the master device from a charging operation determined according to a user-defined charging direction.

In Step 302, it is performed the charging operation together with the master device through the connecting line and the power management module according to the charging instruction.

In conclusion, in the charging method provided by this embodiment, a charging instruction sent from the master device to the power management module of the slave device is received by the slave device, and a charging operation between the master device and the slave device is performed according to the charging instruction. It this way, it is solved that a smart device can only be charged by a mobile power supply which is large in size and inconvenient for a user to carry. Furthermore, the method achieves the effect that two smart devices connected through a connecting line may be charged by each other according to a user-defined charging direction.

Figure 4A:
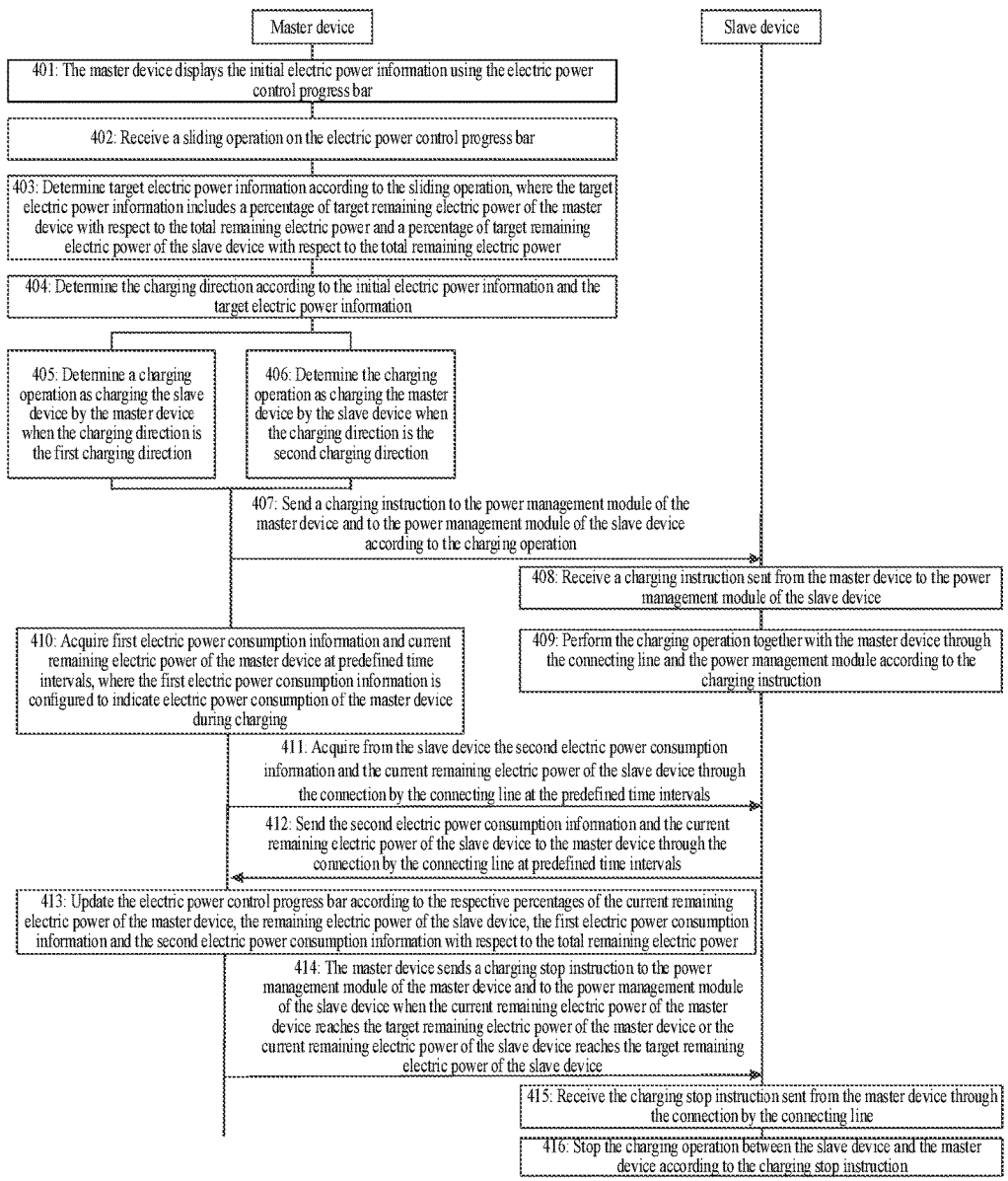
FIG. 4A is a flowchart of a charging method shown according to a further exemplary embodiment.

FIG. 4A is a flowchart of a charging method shown according to a further exemplary embodiment. This embodiment is described by taking an example where the charging method is used in the application scenario as shown in FIG. 1, and the method includes the following steps.

In Step 401, the master device displays the initial electric power information using the electric power control progress bar.

After the user connects two smart devices through a connecting line, i.e., a data communication connection established between the two smart devices, data transmission is available between the two smart devices through the connecting line. For example, the connecting line is a Type C connecting line, with its two ends being Type C connectors. The multifunctional I/O interfaces of the two smart devices are both Type C interfaces. The connection is established between the two smart devices using the Type C connecting line. It is to be noted that the two smart devices having Type C interfaces adopt a Type C protocol.

For the two smart devices connected using the Type C connecting line, one smart device is the master device, and the other smart device is the slave device. The master device can read data from or write data into the slave device, while the slave device cannot read data from or write data into the master device. As a possible implementation, for the two smart devices, the smart device with which the Type C connecting line is connected first is set by default as the master device, and correspondingly, the smart device with which the Type C connecting line is connected later is set by default as the slave device. After the connection is established between the two smart devices, the master device may send a master device handover request to the slave device, and the slave device is switched to the master device according to the master device handover request, and establishes new data communication according to the current relation between the master device and the slave device. Alternatively, the slave device may send a slave device handover request to the master device, and the slave device is switched to the master device according to the slave device handover request, and establishes new data communication according to the current relation between the master device and the slave device. It is well known to those skilled in the art to implement a free switch between the master device and the slave device using the Type C protocol, which is not elaborated any more herein.

In order that the user can learn about the current remaining electric power of the smart devices and set a charging direction according to the remaining electric power, the master device may display initial electric power information using an electric power control progress bar. The initial electric power information includes a percentage of initial remaining electric power of the master device with respect to the total remaining electric power and a percentage of initial remaining electric power of the slave device with respect to the total remaining electric power. The total remaining electric power is equal to the sum of the initial remaining electric power of the master device and the initial remaining electric power of the slave device.

Figure 4B:
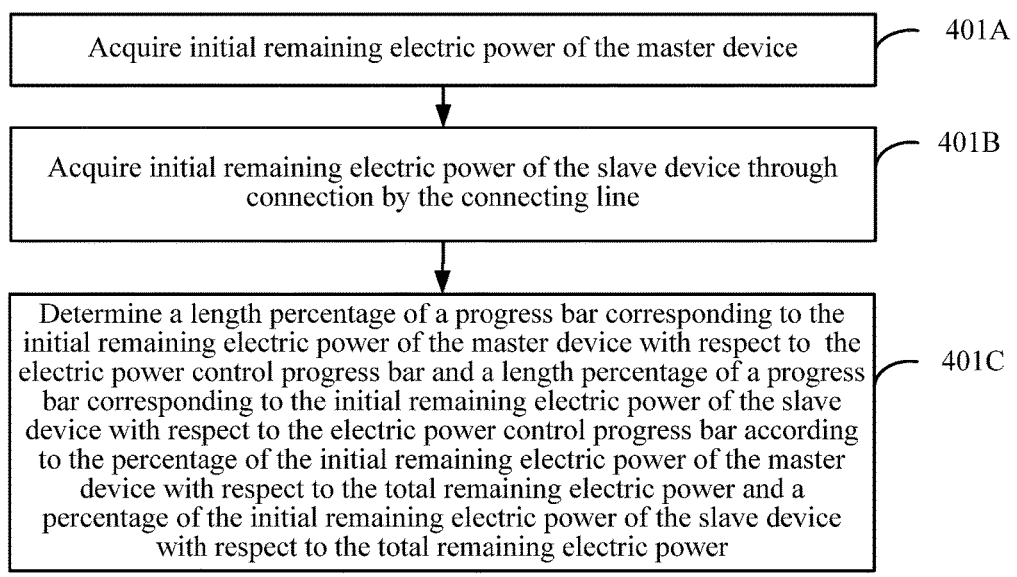
FIG. 4B is a flowchart of an electric power control progress bar display process involved in a charging method shown according to a further exemplary embodiment.

As a possible implementation, as shown in FIG. 4B, this step may include the following sub-steps.

In sub-step 401A, the master device acquires the initial remaining electric power of the master device.

When the user uses the Type C connecting line to connect the two smart devices, the master device of the two smart devices may automatically invoke a preset application program configured to control the charging operation between the two smart devices.

After the preset application program is started, the master device may invoke a corresponding process to acquire the current remaining electric power of the master device and determine the current remaining electric power of the master device as the initial remaining electric power of the master device.

In sub-step 401B, the master device acquires the initial remaining electric power of the slave device through the connection by the connecting line.

The master device can read data from or write data into the slave device. Therefore, when the master device acquires its own remaining electric power, the master device may read the current remaining electric power of the slave device using the Type C connecting line, and determine the current remaining electric power read out from the slave device as the initial remaining electric power of the slave device.

In sub-step 401C, the master device determines a length percentage of a progress bar corresponding to the initial remaining electric power of the master device with respect to the electric power control progress bar and a length percentage of a progress bar corresponding to the initial remaining electric power of the slave device with respect to the electric power control progress bar, according to the percentage of the initial remaining electric power of the master device with respect to the total remaining electric power and the percentage of the initial remaining electric power of the slave device with respect to the total remaining electric power.

The master device obtains the total remaining electric power by calculating the initial remaining electric power of the master device and the initial remaining electric power of the slave device. In order that the user more intuitively learns about the relative size relationship between the remaining electric power of the master device and the remaining electric power of the slave device, the master device further calculates the percentage of the initial remaining electric power of the master device with respect to the total remaining electric power and the percentage of the initial remaining electric power of the slave device with respect to the total remaining electric power.

Immediately after obtaining the percentage of the initial remaining electric power of the master device with respect to the total remaining electric power and the percentage of the initial remaining electric power of the slave device with respect to the total remaining electric power by calculation, the master device displays the electric power control progress bar on its screen. In one embodiment, the length percentage of the progress bar corresponding to the initial remaining electric power of the master device with respect to the electric power control progress bar is the percentage of the initial remaining electric power of the master device with respect to the total remaining electric power, and the length percentage of the progress bar corresponding to the initial remaining electric power of the slave device with respect to the electric power control progress bar is the percentage of the initial remaining electric power of the slave device with respect to the total remaining electric power. It is to be noted that the progress bar corresponding to the initial remaining electric power of the master device and the progress bar corresponding to the initial remaining electric power of the slave device are marked with different colors so that the user may distinguish them easily.

Figure 4C:
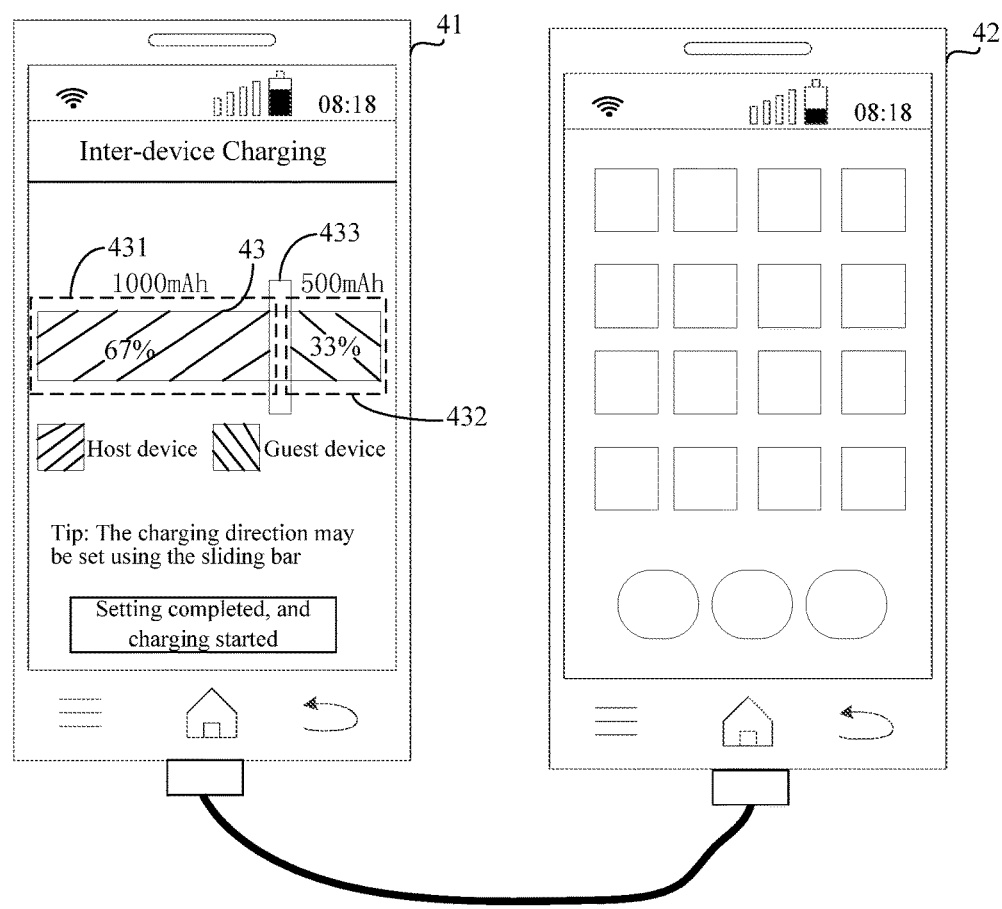
FIG. 4C and FIG. 4D are schematic diagrams indicating implementing of the charging method as shown in FIG. 4A.

For example, as shown in FIG. 4C, when the initial remaining electric power of the master device acquired by the master device (also referred as "Host device") 41 is 1,000 mA and the initial remaining electric power of the slave device acquired from the slave device (also referred as "Guest device") 42 through the connecting line is 500 mA, it can be calculated that the percentage of the initial remaining electric power of the master device with respect to the total remaining electric power is 67%, and that the percentage of the initial remaining electric power of the slave device with respect to the total remaining electric power is 33%. The master device 41 displays the electric power control progress bar 43 according to the calculated percentages, where the length percentage of the progress bar 431 corresponding to the initial remaining electric power of the master device with respect to the electric power control progress bar 43 is 67%, and the length percentage of the progress bar 432 corresponding to the initial remaining electric power of the slave device with respect to the electric power control progress bar 43 is 33%.

In Step 402, the master device receives a sliding operation on the electric power control progress bar.

After the master device displays the electric power control progress bar, the user-defined target electric power information is determined by the user's sliding operation on the electric power control progress bar. The sliding operation may refer to dragging a sliding bar on the electric power control progress bar. It is to be noted that while the master device receives the sliding operation on the electric power control progress bar, it is needed to update numerical information displayed on the electric power control progress bar according to a real-time position of the sliding bar on the electric power control progress bar.

For example, as shown in FIG. 4C, the master device 41 receives the user's sliding operation via the sliding bar 433 on the electric power control progress bar 43, and updates, according to the sliding operation, percentage values displayed on the progress bar 431 and the progress bar 432.

In Step 403, the master device determines target electric power information according to the sliding operation. The target electric power information includes a percentage of target remaining electric power of the master device with respect to the total remaining electric power and a percentage of target remaining electric power of the slave device with respect to the total remaining electric power.

The master device determines, according to the sliding operation, the percentage of the user-defined target remaining electric power of the master device with respect to the total remaining electric power and the percentage of the target remaining electric power of the slave device with respect to the total remaining electric power.

Figure 4D:
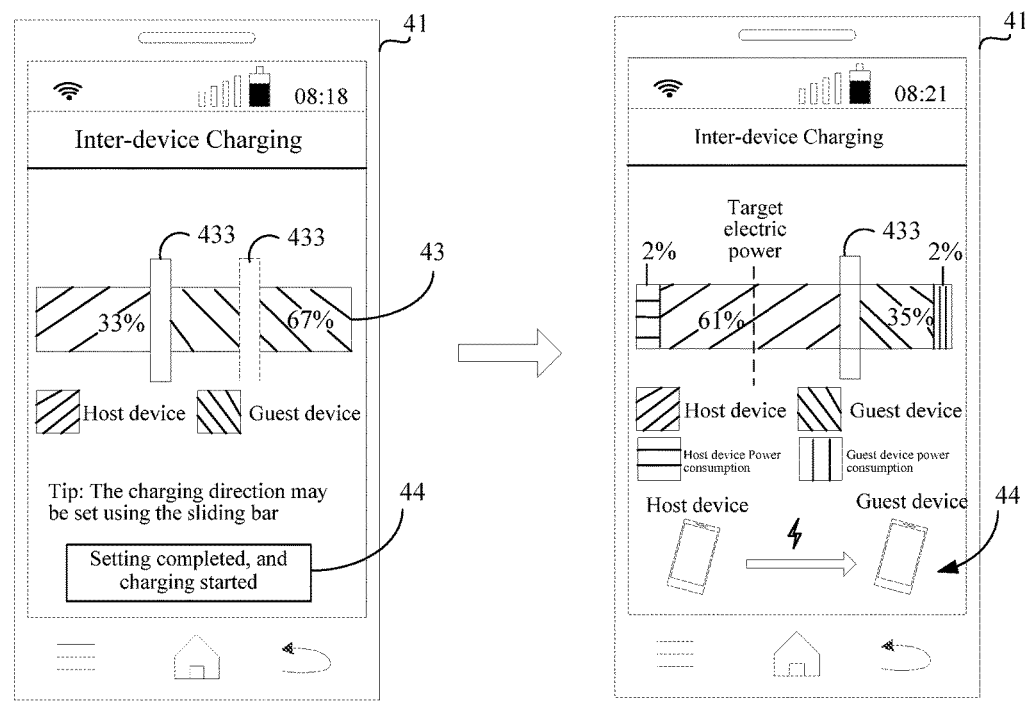

For example, as shown in FIG. 4D, the sliding bar 433 is dragged to the illustrated position, when the user clicks on an "OK" button 44, the master device 41 determines, according to the current position of the sliding bar 433 on the electric power control progress bar 43, that the percentage of the user-defined target remaining electric power of the master device with respect to the total remaining electric power is 33% and that the percentage of the target remaining electric power of the slave device with respect to the total remaining electric power is 67%.

In Step 404, the master device determines the charging direction according to the initial electric power information and the target electric power information.

Because the slave device may be charged by the master device or vice versa, the master device needs to further determine the charging direction according to the initial electric power information and the user-defined target electric power information.

As a possible implementation, this step may include the following sub-steps.

In sub-step 404A, the master device determines that the charging direction is the first charging direction when the percentage of the target remaining electric power of the master device with respect to the total remaining electric power is smaller than the percentage of the initial remaining electric power of the master device with respect to the total remaining electric power, or when the percentage of the target remaining electric power of the slave device with respect to the total remaining electric power is greater than the percentage of the initial remaining electric power of the slave device with respect to the total remaining electric power.

The first charging direction refers to that the slave device is charged by the master device.

When the charging direction is the first charging direction, Step 405 is executed.

For example, as shown in FIG. 4D, the master device 41 determines that the charging direction is the first charging direction when the percentage of the target remaining electric power of the master device with respect to the total remaining electric power is 33%, which is smaller than the percentage (67%) of the initial remaining electric power of the master device with respect to the total remaining electric power.

In sub-step 404B, the master device determines that the charging direction is the second charging direction when the percentage of the target remaining electric power of the master device with respect to the total remaining electric power is greater than the percentage of the initial remaining electric power of the master device with respect to the total remaining electric power, or when the percentage of the target remaining electric power of the slave device with respect to the total remaining electric power is smaller than the percentage of the initial remaining electric power of the slave device with respect to the total remaining electric power.

The second charging direction refers to that the master device is charged by the slave device.

When the charging direction is the second charging direction, Step 406 is executed.

In Step 405, the master device determines a charging operation as charging the slave device by the master device when the charging direction is the first charging direction.

In order that the user can more intuitively learn about the defined charging direction, after determining the charging direction, the master device may also display a corresponding charging direction icon.

For example, as shown in FIG. 4D, the master device 41 displays a corresponding first charging direction icon 45 according to a user-defined charging direction.

In Step 406, the master device determines the charging operation as charging the master device by the slave device when the charging direction is the second charging direction.

Correspondingly, a corresponding second charging direction icon is displayed when the master device determines that the charging direction is the second charging direction.

In Step 407, the master device sends a charging instruction to the power management module of the master device and to the power management module of the slave device according to the charging operation.

The master device sends the charging instruction to the power management module of the master device and to the power management module of the slave device according to the charging operation.

When the charging operation indicates that the slave device is charged by the master device, the master device sends to the power management module of the master device an instruction for instructing the master device to discharge, and sends to the power management module of the slave device through the Type C connecting line an instruction for instructing the slave device to receive the electric power discharged by the master device. When the charging operation indicates that the master device is charged by the slave device, the master device sends to the power management module of the slave device an instruction for instructing the slave device to discharge through the Type C connecting line, and sends to the power management module of the master device an instruction for instructing the master device to receive the electric power discharged by the slave device.

In Step 408, the slave device receives a charging instruction sent from the master device to the power management module of the slave device.

Correspondingly, the slave device receives through the Type C connecting line the charging instruction sent from the master device.

In Step 409, the charging operation of the slave device is performed together with the master device through the connecting line and the power management module according to the charging instruction.

When the slave device receives the charging instruction instructing itself to charge the master device, the slave device charges the master device through the Type C connecting line.

When the slave device receives the charging instruction instructing the master device to charge the slave device, the slave device receives through the Type C connecting line electric power delivered from the master device.

In Step 410, the master device acquires first electric power consumption information and current remaining electric power of the master device at predefined time intervals. The first electric power consumption information is configured to indicate electric power consumption of the master device during charging.

In order that the user can learn about the charging process, the master device acquires the current remaining electric power of the master device at predefined time intervals which may be 10 seconds, for example.

In addition, during the charging process between the master device and the slave device, due to reasons such as running of programs and user operation or the like, the electric power is continuously consumed. In order that the user can learn about the device power consumption, the master device not only acquires the current remaining electric power of the master device, but also simultaneously acquires the first electric power consumption information which is used to indicate electric power consumption of the master device during charging.

In Step 411, the master device acquires, from the slave device, the second electric power consumption information and the current remaining electric power of the slave device through the connection by the connecting line at the predefined time intervals.

Correspondingly, when the master device acquires the first electric power consumption information and the current remaining electric power of the master device, the master device also needs to acquire the second electric power consumption information on the slave device and the current remaining electric power of the slave device using the Type C connecting line. The second electric power consumption information is configured to indicate electric power consumption of the slave device during charging.

In Step 412, the slave device sends the second electric power consumption information and the current remaining electric power of the slave device to the master device through the connection by the connecting line at predefined time intervals.

Correspondingly, the slave device sends, through the Type C connecting line, the second electric power consumption information and the current remaining electric power of the slave device to the master device.

It is to be noted that the master device may initiate acquiring the second electric power consumption information and the current remaining electric power of the slave device, or may receive the second electric power consumption information and the current remaining electric power of the slave device initiatively acquired by and sent from the slave device, to which the present disclosure does not limit.

In Step 413, the master device updates the electric power control progress bar according to the respective percentages of the current remaining electric power of the master device, the current remaining electric power of the slave device, the first electric power consumption information and the second electric power consumption information with respect to the total remaining electric power.

The master device updates, in real time, a numerical value on the electric power control progress bar according to the acquired current remaining electric power of the master device, the current remaining electric power of the slave device, the first electric power consumption information and the second electric power consumption information.

When the master device displays the current electric power information using the electric power control progress bar, different colors are used to mark various progress bars including a progress bar corresponding to the current remaining electric power of the master device, a progress bar corresponding to the current remaining electric power of the slave device, a progress bar corresponding to the first electric power consumption information and a progress bar corresponding to the second electric power consumption information.

For example, as shown in FIG. 4D, the master device 41 uses different background colors to mark the current remaining electric power of the master device, the current remaining electric power of the slave device, the first electric power consumption information and the second electric power consumption information, respectively.

It is to be noted that the master device may also display on the electric power control progress bar, according to the user-defined target electric power information, a corresponding target electric power prompt identifier for indicating the user-defined target electric power.

It is also to be noted that the master device may also obtain electric power to be charged by calculating the current remaining electric power and the target remaining electric power. The master device may then determine remaining charging time by dividing the electric power to be charged by the current charging rate and display the remaining charging time, so that the user may know the charging time easily.

It is to be noted that in order to ensure good charging effect, after acquiring the first electric power consumption information and the second electric power consumption information, the master device calculates a first power consumption rate corresponding to the master device and a second power consumption rate corresponding to the slave device during charging. When the first power consumption rate or the second power consumption rate is greater than a preset power consumption threshold, the master device determines that the power consumption is too fast during charging, and then sends out a prompt message to remind the user to reduce device use to ensure the charging effect. Alternatively, the master device may automatically invoke a program to stop preset programs so as to achieve better charging effect. The preset program may be a background running program or a not frequently used program.

In Step 414, the master device sends a charging stop instruction to the power management module of the master device and to the power management module of the slave device, when the current remaining electric power of the master device reaches the target remaining electric power of the master device, or when the current remaining electric power of the slave device reaches the target remaining electric power of the slave device.

When the master device detects that the current remaining electric power reaches the corresponding target remaining electric power, the master device may automatically send the charging stop instruction to the power management module of the master device and to the power management module of the slave device, so that the charging operation between the master device and the slave device will stop as instructed.

In Step 415, the slave device receives the charging stop instruction sent by the master device through the connection by the connecting line.

The charging stop instruction is sent out when the master device detects that the current remaining electric power of the master device reaches the target electric power of the master device or the current remaining electric power of the slave device reaches the target electric power of the slave device.

In Step 416, the slave device stops the charging operation between the slave device and the master device according to the charging stop instruction.

Correspondingly, the power management module of the slave device stops the charging operation between the slave device and the master device according to the received charging stop instruction.

In conclusion, in the charging method provided by this embodiment, a corresponding charging instruction is sent to the power management module of the master device and to the power management module of the slave device according to a charging direction defined by the master device, thereby implementing charging the slave device by the master device or charging the master device by the slave device. In this way, it is solved that a smart device can only charged by a mobile power supply which is large in size and thus is inconvenient for a user to carry. Furthermore, the method achieves the effect that two smart devices connected through a connecting line may be charged by each other according to a user-defined charging direction.

In this embodiment, the master device displays information about the electric power of the master device and the slave device in form of progress bar, and receives the user-defined charging direction and charge electric power using the progress bar, so that the whole charging process is more intuitive and accurate.

In this embodiment, the master device may also acquire, in real time, the current remaining electric power of the master device and the slave device, and display on the progress bar the power consumption of the current remaining electric power during charging, so that the user can learn about the charging process easily.

In this embodiment, when the current remaining electric power reaches the user-defined target electric power, the master device sends a charging stop instruction to a power control module of the master device and a power control module of the slave device, thereby avoiding overcharging the master device or the slave device and improving the accuracy in charging the master device or the slave device.

Figure 5:
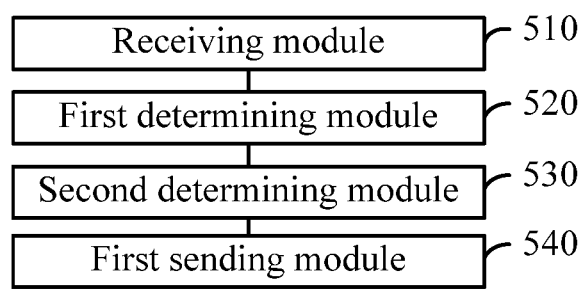
FIG. 5 is a block diagram of a charging apparatus shown according to an exemplary embodiment.

FIG. 5 is a block diagram of a charging apparatus shown according to an exemplary embodiment. The charging apparatus may function as the master device 120 in FIG. 1 in part or in whole in form of software, hardware or combination thereof. The charging apparatus may include: a receiving module 510, configured to receive a direction setting signal, and determine a charging direction according to the direction setting signal; a first determining module 520, configured to determine a charging operation as charging the slave device by the master device when the charging direction is a first charging direction; a second determining module 530, configured to determine the charging operation as charging the master device by the slave device when the charging direction is a second charging direction opposite to; and a first sending module 540, configured to send a charging instruction to the power management module of the master device and to the power management module of the slave device according to the charging operation.

In conclusion, by using the charging apparatus provided by this embodiment, a charging instruction is sent to the power management module of the master device and to the power management module of the slave device according to a charging direction defined by the master device, thereby implementing charging the slave device by the master device or charging the master device by the slave device. In this way, it is solved that a smart device can only be charged by a mobile power supply which is large in size and thus is inconvenient for a user to carry. Furthermore, the method achieves the effect that two smart devices connected through a connecting line may be charged by each other according to a user-defined charging direction.

Figure 6:
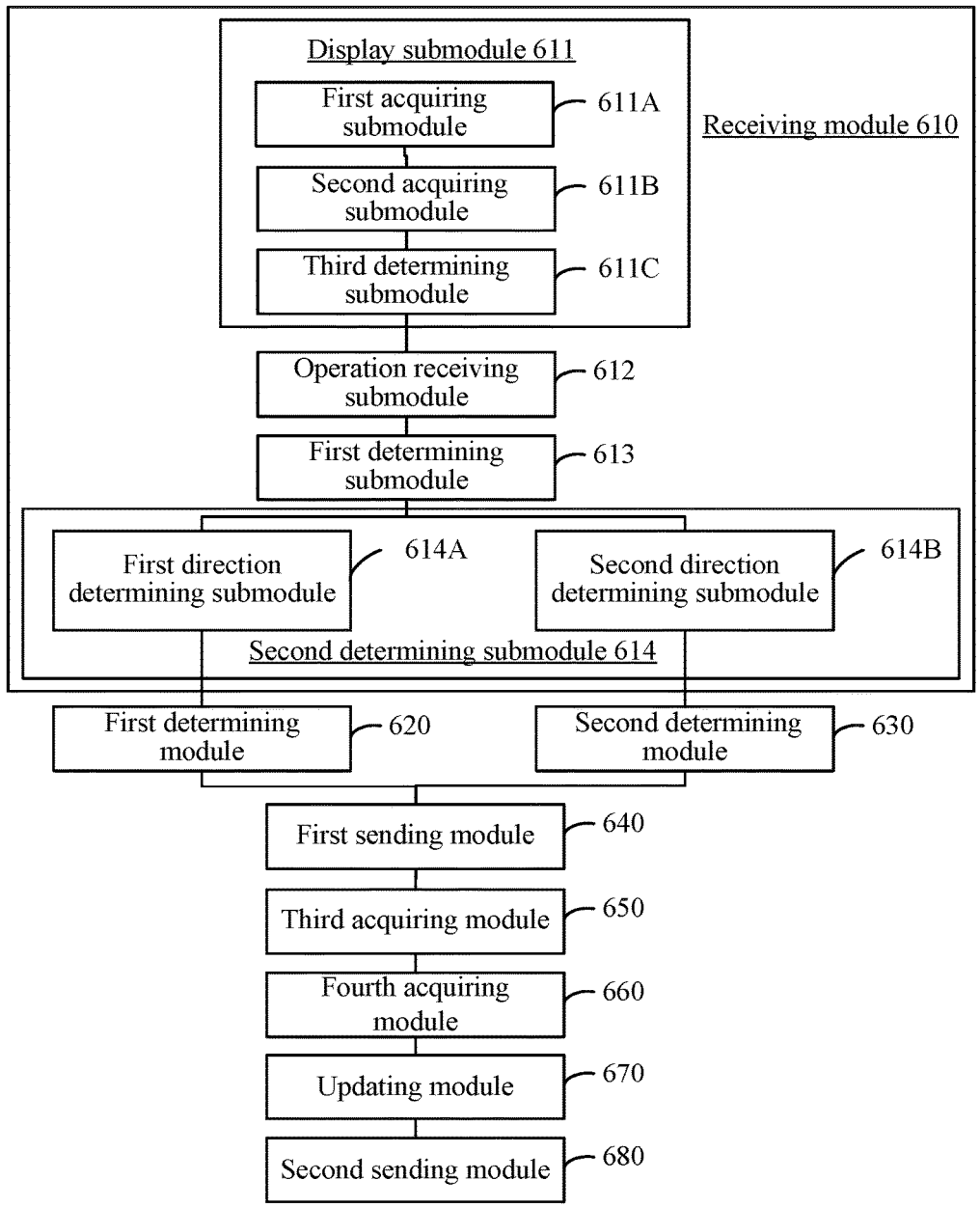
FIG. 6 is a block diagram of a charging apparatus shown according to another exemplary embodiment.

FIG. 6 is a block diagram of a charging apparatus shown according to another exemplary embodiment. The charging apparatus may function as the master device 120 in FIG. 1 in part or in whole in form of software or hardware or combination of both. The charging apparatus may include: a receiving module 610, configured to receive a direction setting signal, and determine a charging direction according to the direction setting signal; a first determining module 620, configured to determine a charging operation as charging the slave device by the master device when the charging direction is a first charging direction; a second determining module 630, configured to determine the charging operation as charging the master device by the slave device when the charging direction is a second charging direction opposite to the first charging direction; and a first sending module 640, configured to send a charging instruction to the power management module of the master device and to the power management module of the slave device according to the charging operation.

Optionally, the receiving module 610 includes: a display submodule 611, configured to display initial electric power information using an electric power control progress bar, where the initial electric power information includes a percentage of initial remaining electric power of the master device with respect to total remaining electric power and a percentage of initial remaining electric power of the slave device with respect to the total remaining electric power, and the total remaining electric power is equal to the sum of the initial remaining electric power of the master device and the initial remaining electric power of the slave device; an operation receiving submodule 612, configured to receive a sliding operation on the electric power control progress bar; a first determining submodule 613, configured to determine target electric power information according to the sliding operation, where the target electric power information includes a percentage of target remaining electric power of the master device with respect to the total remaining electric power and a percentage of target remaining electric power of the slave device with respect to the total remaining electric power; and a second determining submodule 614, configured to determine the charging direction according to the initial electric power information and the target electric power information.

Optionally, the second determining submodule 614 includes: a first direction determining submodule 614A, configured to determine that the charging direction is the first charging direction when the percentage of the target remaining electric power of the master device with respect to the total remaining electric power is smaller than the percentage of the initial remaining electric power of the master device with respect to the total remaining electric power, or when the percentage of the target remaining electric power of the slave device with respect to the total remaining electric power is greater than the percentage of the initial remaining electric power of the slave device with respect to the total remaining electric power; and a second direction determining submodule 614B, configured to determine that the charging direction is the second charging direction when the percentage of the target remaining electric power of the master device with respect to the total remaining electric power is greater than the percentage of the initial remaining electric power of the master device with respect to the total remaining electric power, or when the percentage of the target remaining electric power of the slave device with respect to the total remaining electric power is smaller than the percentage of the initial remaining electric power of the slave device with respect to the total remaining electric power.

Optionally, the display submodule 611 includes: a first acquiring submodule 611A, configured to acquire the initial remaining electric power of the master device; a second acquiring submodule 611B, configured to acquire the initial remaining electric power of the slave device through a connection by the connecting line; and a third determining submodule 611C, configured to determine a length percentage of a progress bar corresponding to the initial remaining electric power of the master device with respect to the electric power control progress bar and a length percentage of a progress bar corresponding to the initial remaining electric power of the slave device with respect to the electric power control progress bar according to the percentage of the initial remaining electric power of the master device with respect to the total remaining electric power and the percentage of the initial remaining electric power of the slave device with respect to the total remaining electric power.

Optionally, the apparatus further includes: a third acquiring module 650, configured to acquire first electric power consumption information and current remaining electric power of the master device at predefined time intervals, where the first electric power consumption information is configured to indicate electric power consumption of the master device during charging; a fourth acquiring module 660, configured to acquire from the slave device second electric power consumption information and current remaining electric power of the slave device through the connection by the connecting line at the predefined time intervals, where the second electric power consumption information is configured to indicate electric power consumption of the slave device during charging; and an updating module 670, configured to update the electric power control progress bar according to respective percentages of the current remaining electric power of the master device, the current remaining electric power of the slave device, the first electric power consumption information and the second electric power consumption information with respect to the total remaining electric power.

Optionally, when the master device displays current electric power information using the electric power control progress bar, different colors are used to mark a progress bar corresponding to the current remaining electric power of the master device, a progress bar corresponding to the current remaining electric power of the slave device, a progress bar corresponding to the first electric power consumption information and a progress bar corresponding to the second electric power consumption information.

Optionally, the apparatus further includes: a second sending module 680, configured to send a charging stop instruction to the power management module of the master device and to the power management module of the slave device when the current remaining electric power of the master device reaches the target remaining electric power of the master device or the current remaining electric power of the slave device reaches the target remaining electric power of the slave device.

Optionally, the connecting line is a Type C connecting line with Type C connectors at its two ends, and the multifunctional I/O interfaces of the master device and the slave device are Type C interfaces.

In conclusion, by using the charging apparatus provided by this embodiment, a charging instruction is sent to the power management module of the master device and to the power management module of the slave device according to a charging direction defined by the master device, thereby implementing charging the slave device by the master device or charging the master device by the slave device. In this way, it is solved that a smart device can only charged by a mobile power supply which is large in size and inconvenient for a user to carry. Furthermore, the method achieves the effect that two smart devices connected by a connecting line may be charged by each other according to a user-defined charging direction.

In this embodiment, the master device displays information about the electric power of the master device and the slave device in form of a progress bar, and receives the user-defined charging direction and charge electric power using the progress bar, so that the whole charging process is more intuitive and accurate.

In this embodiment, the master device may also acquire, in real time, the current remaining electric power of the master device and the slave device, and display on the progress bar the power consumption of the current remaining electric power during charging, so that the user can learn about the charging process easily.

In this embodiment, when the current remaining electric power reaches the user-defined target electric power, the master device sends a charging stop instruction to a power control module of the master device and a power control module of the slave device, thereby avoiding overcharging the master device or the slave device and improving the accuracy in charging the master device or the slave device.

Figure 7:
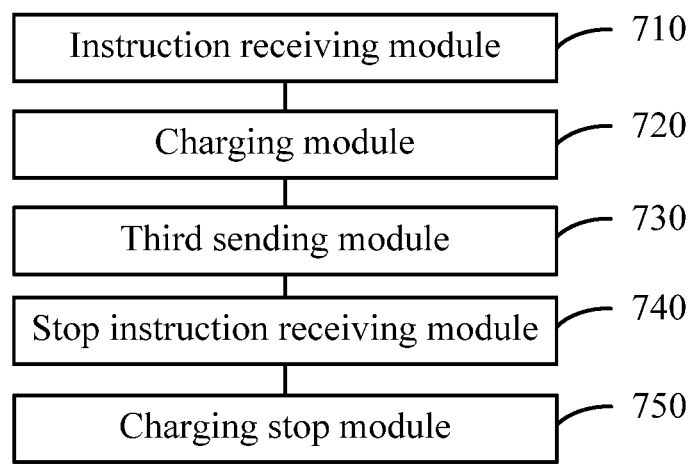
FIG. 7 is a block diagram of a charging apparatus shown according to a further exemplary embodiment.

FIG. 7 is a block diagram of a charging apparatus shown according to a further exemplary embodiment. The charging apparatus may function as the slave device 160 in FIG. 1 in part or in whole in form of software or hardware or combination thereof. The charging apparatus may include: an instruction receiving module 710, configured to receive a charging instruction sent from the master device to a power management module of the slave device, where the charging instruction is generated by the master device from a charging operation determined according to a user-defined charging direction; and a charging module 720, configured to perform the charging operation together with the master device through the connecting line and the power management module according to the charging instruction.

Optionally, the apparatus further includes: a third sending module 730, configured to send second electric power consumption information and current remaining electric power of the slave device to the master device through the connection by the connecting line at predefined time intervals, where the second electric power consumption information is configured to indicate electric power consumption of the slave device during charging.

Optionally, the apparatus further includes: a stop instruction receiving module 740, configured to receive a charging stop instruction sent from the master device through the connection by the connecting line, where the charging stop instruction is sent out when the master device detects that current remaining electric power of the master device reaches target electric power of the master device or current remaining electric power of the slave device reaches target electric power of the slave device; and a charging stop module 750, configured to stop the charging operation between the slave device and the master device according to the charging stop instruction.

Optionally, the connecting line is a Type C connecting line with Type C connectors at its two ends, and the multifunctional I/O interfaces of the master device and the slave device are Type C interfaces.

In conclusion, by using the charging apparatus provided by this embodiment, a charging instruction sent from the master device to the power management module of the slave device is received by the slave device, and a charging operation between the master device and the slave device is performed according to the charging instruction. In this way, it is solved that a smart device can only be charged by a mobile power supply which is large in size and inconvenient for a user to carry. Furthermore, the method achieves the effect that two smart devices connected through a connecting line may be charged by each other according to a user-defined charging direction.

With regard to the apparatus in the foregoing embodiments, specific operation manners using modules thereof have been described in detail with reference to the embodiments of the charging method, which are not elaborated herein.

Figure 8:
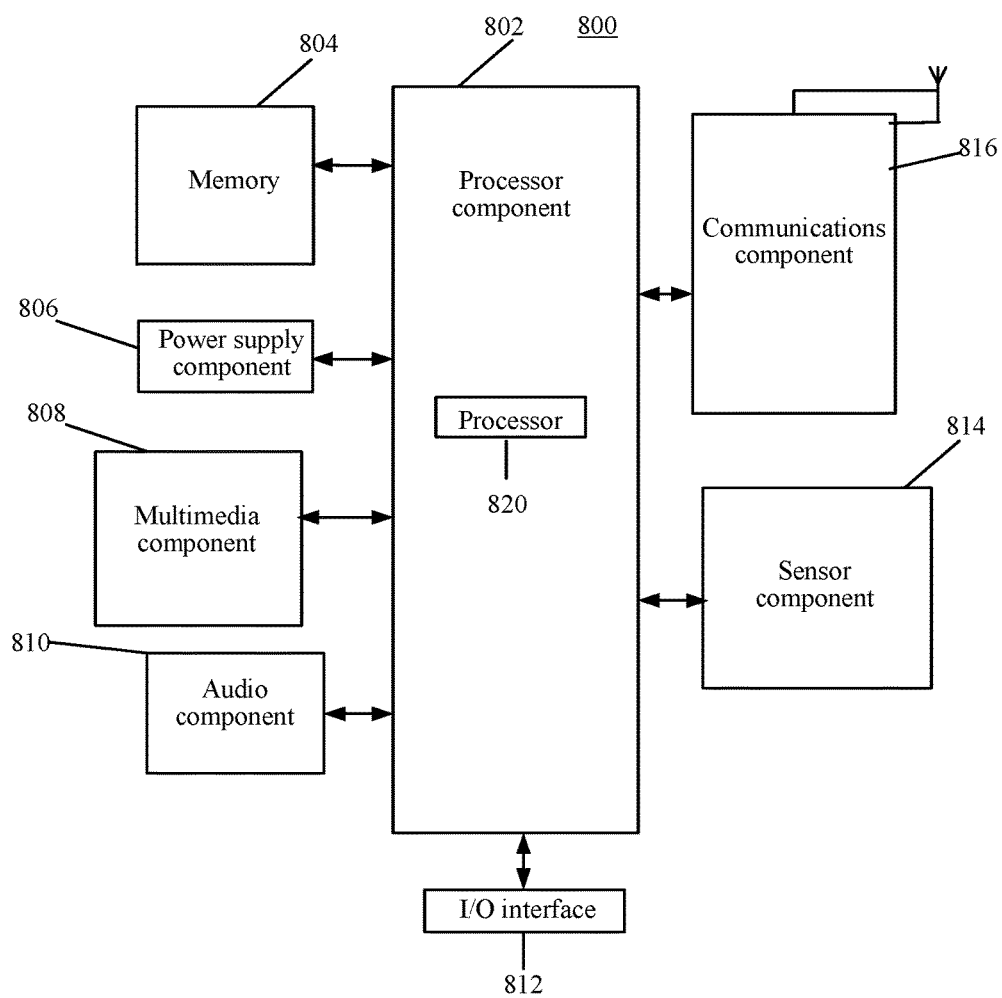
FIG. 8 is a block diagram of a device shown according to an exemplary embodiment.

FIG. 8 is a block diagram of a device 800 shown according to an exemplary embodiment. The device 800 can be the master device or the slave device as described above. For example, the device 800 may be a smart mobile phone, a tablet device or an e-book reader, etc.

Referring to FIG. 8, the device 800 may include one or more components as below: a processor component 802, a memory 804, a power supply component 806, a multimedia component 808, an audio component 810, an input/output (I/O) interface 812, a sensor component 814 and a communications component 816.

The processor module 802 generally controls the overall operation on the device 800, for example, display, telephone call, data communications, and operation associated with camera operation and record operation. The processor component 802 may include one or more processors 820 for executing instructions to complete the steps of the foregoing method in part or in whole. In addition, the processor component 802 may include one or more modules for the convenience of interaction between the processor component 802 and other components. For example, the processor component 802 may include a multimedia module for the convenience of interaction between the multimedia component 808 and the processor component 802.

The memory 804 is configured to store data of different types so as to support the operation on the device 800. Examples of the data include instructions of any application program or method operated on the device 800, contact data, phonebook data, a message, a picture and a video, etc. The memory 804 may be implemented by any type of volatile or non-volatile memory device or combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk or an optical disk.

The power supply component 806 provides power for components of the device 800. The power supply component 806 may include a power management system, one or more power supplies, and other components associated with generation, management and power distribution of the device 800.

The multimedia component 808 includes a screen between the device 800 and a user for providing an output interface. In some embodiments, the screen may include a liquid crystal display (LCD) and a touch panel (TP). If the screen includes the touch panel, the screen may be implemented as a touch screen for receiving an input signal from the user. The touch panel includes one or more touch sensors for sensing touching, sliding and gestures on the touch panel. The touch sensor can not only sense a boundary of a touch or slide, but also detect the time duration and pressure related to the touch or slide operation. In some embodiments, the multimedia component 808 includes a front-facing camera and/or a rear-facing camera. When the device 800 is in an operation mode, for example, a shooting mode or a video mode, the front-facing camera and/or the rear-facing camera may receive external multimedia data. Each front-facing camera and rear-facing camera may be a fixed optical lens system or have a focal length and optical zoom capacity.

The audio component 810 is configured to output and/or input an audio signal. For example, the audio component 810 includes a microphone (MIC); when the device 800 is in an operation mode such as a call mode, a record mode and a speech recognition mode, the microphone is configured to receive an external audio signal. The received audio signal may be further stored in the memory 804 or sent out by the communications component 816. In some embodiments, the audio component 810 further includes a loudspeaker for outputting an audio signal.

The I/O interface 812 provides an interface for the processor component 802 and a peripheral interface module, and the peripheral interface module may be a keyboard, a click wheel or buttons, etc. These buttons may include but are not limited to: a home button, a volume button, a start button and a lock button. For example, the I/O interface 812 also may be a Type C interface.

The sensor component 814 includes one or more sensors for providing the device 800 with state evaluation from all aspects. For example, the sensor component 814 may detect the on/off state of the device 800, relative positioning of components, for example, the components are the displayer and keypads of the device 800; the sensor component 814 also may detect the position change of the device 800 or a component thereof, the presence or absence of users' touch on the device 800, the direction or acceleration/deceleration of the device 800, and temperature variation of the device 800. The sensor component 814 may include a proximity detector, which is configured to detect the presence of a nearby object in case of no physical contact. The sensor component 814 may also include an optical sensor, for example, a CMO or CCD image sensor, used in the application of imaging. In some embodiments, the sensor component 814 may also include an acceleration sensor, a gyro sensor, a magnetic sensor, a pressure sensor, or a temperature sensor.

The communications component 816 is configured to facilitate wired communications or wireless communications between the device 800 and other devices. The device 800 is available for access to a wireless network based on communications standards, for example, WiFi, 2G or 3G, or a combination thereof. In an exemplary embodiment, the communications component 816 receives, by means of a broadcast channel, a broadcast signal or broadcast-related information from an external broadcast management system.

In an exemplary embodiment, the communications component 816 also includes a near field communication (NFC) module to promote short-range communications. For example, the NFC module may be implemented on the basis of Radio Frequency Identification (RFID) Technology, Infrared Data Association (IrDA) Technology, Ultra-wide Bandwidth (UWB) Technology, Bluetooth (BT) Technology and other technologies.

In an exemplary embodiment, the device 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components to execute the foregoing method.

In an exemplary embodiment, a non-transitory computer-readable storage medium including an instruction is also provided, for example, a memory 804 including the instruction, the foregoing instruction may be executed by the processor 820 of the device 800 to achieve the foregoing method. For example, the non-transitory computer-readable storage medium may be a ROM, a random access memory (RAM), a CD-ROM, a magnetic tape, a floppy disk and an optical data memory device, etc.

In a non-transitory computer-readable storage medium, an instruction in the storage medium is executed by the processor of the device 800 so that the device 800 can execute the foregoing charging method of the master device side or the slave device side.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A charging method implemented by a master device with a multifunctional input/output (I/O) interface configured for connection with a multifunctional I/O interface of a slave device through a connecting line, the charging method comprising:

displaying initial electric power information using an electric power control progress bar in the master device, wherein the initial electric power information comprises a percentage of initial remaining electric power of the master device with respect to total remaining electric power and a percentage of initial remaining electric power of the slave device with respect to the total remaining electric power, and the total remaining electric power is equal to the sum of the initial remaining electric power of the master device and the initial remaining electric power of the slave device;

receiving an input operation on the electric power control progress bar;

determining target electric power information according to the input operation, wherein the target electric power information comprises a percentage of target remaining electric power of the master device with respect to the total remaining electric power and a percentage of target remaining electric power of the slave device with respect to the total remaining electric power;

determining a charging direction according to the initial electric power information and the target electric power information;

determining a charging operation as charging the slave device with the master device, when the charging direction is a first charging direction which is from the mater device to the slave device;

determining the charging operation as charging the master device with the slave device, when the charging direction is a second charging direction opposite to the first charging direction; and sending to a power management module of the master device and to a power management module of the slave device a charging instruction according to the charging operation determined; and performing the charging operation together with the master device through a connecting line for connecting the master device with the slave device and the power management module according to the charging instruction.

2. The method of claim 1, wherein
the input operation is a sliding operation on the electric power control progress bar.

3. The method of claim 2, wherein determining the charging direction according to the initial electric power information and the target electric power information comprises:

determining the charging direction as the first charging direction when the percentage of the target remaining electric power of the master device with respect to the total remaining electric power is smaller than the percentage of the initial remaining electric power of the master device with respect to the total remaining electric power, or when the percentage of the target remaining electric power of the slave device with respect to the total remaining electric power is greater than the percentage of the initial remaining electric power of the slave device with respect to the total remaining electric power; and determining the charging direction as the second charging direction when the percentage of the target remaining electric power of the master device with respect to the total remaining electric power is greater than the percentage of the initial remaining electric power of the master device with respect to the total remaining electric power, or when the percentage of the target remaining electric power of the slave device with respect to the total remaining electric power is smaller than the percentage of the initial remaining electric power of the slave device with respect to the total remaining electric power.

4. The method of claim 2, wherein displaying initial electric power information using the electric power control progress bar comprises:

acquiring the initial remaining electric power of the master device;

acquiring the initial remaining electric power of the slave device through the connection by the connecting line; and determining a length percentage of a progress bar corresponding to the initial remaining electric power of the master device with respect to the electric power control progress bar and a length percentage of a progress bar corresponding to the initial remaining electric power of the slave device with respect to the electric power control progress bar according to the percentage of the initial remaining electric power of the master device with respect to the total remaining electric power and the percentage of the initial remaining electric power of the slave device with respect to the total remaining electric power, respectively.

5. The method of claim 2, further comprising:
sending a charging stop instruction to the power management module of the master device and to the power management module of the slave device when the current remaining electric power of the master device reaches the target remaining electric power of the master device or the current remaining electric power of the slave device reaches the target remaining electric power of the slave device.

6. The method of claim 1, further comprising:
acquiring first electric power consumption information and current remaining electric power of the master device at predefined time intervals, wherein the first electric power consumption information is configured to indicate electric power consumption of the master device during charging;

acquiring, from the slave device, second electric power consumption information and current remaining electric power of the slave device through the connection by the connecting line at the predefined time intervals, wherein the second electric power consumption information is configured to indicate electric power consumption of the slave device during charging; and updating the electric power control progress bar according to respective percentages of the current remaining electric power of the master device, the current remaining electric power of the slave device, the first electric power consumption information and the second electric power consumption information with respect to the total remaining electric power.

7. The method of claim 6, wherein when the current electric power information is displayed by the master device using the electric power control progress bar, a progress bar corresponding to the current remaining electric power of the master device, a progress bar corresponding to the current remaining electric power of the slave device, a progress bar corresponding to the first electric power consumption information and a progress bar corresponding to the second electric power consumption information are marked by different colors.

8. The method of claim 1, wherein the connecting line is a Type C connecting line with Type C connectors at its two ends, and the multifunctional I/O interfaces of the master device and the slave device are Type C interfaces.

9. A master device, comprising:
a processor;
a multifunctional input/output (I/O) interface configured for connection with a multifunctional I/O interface of a slave device through a connecting line; and
a memory configured to store a processor-executable instruction,
wherein the processor of the master device is configured to perform:
displaying initial electric power information using an electric power control progress bar in the master device, wherein the initial electric power information comprises a percentage of initial remaining electric power of the master device with respect to total remaining electric power and a percentage of initial remaining electric power of the slave device with respect to the total remaining electric power, and the total remaining electric power is equal to the sum of the initial remaining electric power of the master device and the initial remaining electric power of the slave device;

receiving an input operation on the electric power control progress bar;

determining target electric power information according to the input operation, wherein the target electric power information comprises a percentage of target remaining electric power of the master device with respect to the total remaining electric power and a percentage of target remaining electric power of the slave device with respect to the total remaining electric power;

determining a charging direction according to the initial electric power information and the target electric power information;

determining a charging operation as charging the slave device with the master device when the charging direction is a first charging direction which is from the mater device to the slave device;

determining the charging operation as charging the master device with the slave device when the charging direction is a second charging direction opposite to the first charging direction; and sending to a power management module of the master device and to a power management module of the slave device a charging instruction according to the charging operation determined; and performing the charging operation together with the master device through a connecting line for connecting the master device with the slave device and the power management module according to the charging instruction.

10. The master device of claim 9, wherein
the input operation is a sliding operation on the electric power control progress bar.

11. The master device of claim 10, wherein determining the charging direction according to the initial electric power information and the target electric power information comprises:

determining the charging direction as the first charging direction when the percentage of the target remaining electric power of the master device with respect to the total remaining electric power is smaller than the percentage of the initial remaining electric power of the master device with respect to the total remaining electric power, or when the percentage of the target remaining electric power of the slave device with respect to the total remaining electric power is greater than the percentage of the initial remaining electric power of the slave device with respect to the total remaining electric power; and determining the charging direction as the second charging direction when the percentage of the target remaining electric power of the master device with respect to the total remaining electric power is greater than the percentage of the initial remaining electric power of the master device with respect to the total remaining electric power, or when the percentage of the target remaining electric power of the slave device with respect to the total remaining electric power is smaller than the percentage of the initial remaining electric power of the slave device with respect to the total remaining electric power.

12. The master device of claim 10, wherein displaying initial electric power information using an electric power control progress bar comprises:

acquiring the initial remaining electric power of the master device;

acquiring the initial remaining electric power of the slave device through the connection by the connecting line; and determining a length percentage of a progress bar corresponding to the initial remaining electric power of the master device with respect to the electric power control progress bar and a length percentage of a progress bar corresponding to the initial remaining electric power of the slave device with respect to the electric power control progress bar according to the percentage of the initial remaining electric power of the master device with respect to the total remaining electric power and the percentage of the initial remaining electric power of the slave device with respect to the total remaining electric power, respectively.

13. The master device of claim 9, wherein the processor is further configured to perform:

acquiring first electric power consumption information and current remaining electric power of the master device at predefined time intervals, wherein the first electric power consumption information is configured to indicate electric power consumption of the master device during charging;

acquiring, from the slave device, second electric power consumption information and current remaining electric power of the slave device through the connection by the connecting line at the predefined time intervals, wherein the second electric power consumption information is configured to indicate electric power consumption of the slave device during charging; and updating the electric power control progress bar according to respective percentages of the current remaining electric power of the master device, the current remaining electric power of the slave device, the first electric power consumption information and the second electric power consumption information with respect to the total remaining electric power.

* * * * *